United States Patent
Komori

(10) Patent No.: US 8,077,876 B2
(45) Date of Patent: Dec. 13, 2011

(54) DELIVERY SYSTEM, TRANSMISSION APPARATUS, AND DELIVERY METHOD

(75) Inventor: Shinichi Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 12/396,576

(22) Filed: Mar. 3, 2009

(65) Prior Publication Data

US 2009/0226002 A1 Sep. 10, 2009

(30) Foreign Application Priority Data

Mar. 4, 2008 (JP) ................................ P2008-053864

(51) Int. Cl.
*H04B 3/00* (2006.01)
(52) U.S. Cl. ............. 381/77; 381/98; 381/119; 381/124
(58) Field of Classification Search ................... 381/56, 381/77, 86, 94, 98, 119, 124
See application file for complete search history.

(56) References Cited

U.S. PATENT DOCUMENTS 7,623,718 B2 * 11/2009 Endo .............................. 382/232
2008/0199020 A1 * 8/2008 Suzuki ............................. 381/77

FOREIGN PATENT DOCUMENTS

JP 2001 16109 1/2001
JP 2003 111200 4/2003

* cited by examiner

*Primary Examiner* — Dung A. Le
(74) *Attorney, Agent, or Firm* — Frommer Lawrence & Haug LLP; William S. Frommer

(57) ABSTRACT

A delivery system is disclosed, which has a transmission apparatus and a plurality of reception terminals communicably connected through a network. The transmission apparatus includes a correction section which pre-obtains a plurality of types of correction coefficients according to acoustic characteristics of the plurality of reception terminals and forms a plurality of corrected audio signals based on an audio signal and the correction coefficients; a conversion section which converts the plurality of corrected audio signals into a plurality of pieces of delivery data; and a delivery server which delivers the delivery data to the reception terminals through the network. Each of the reception terminals includes a communication section which communicates with the transmission apparatus. The transmission apparatus delivers to the reception terminals the delivery data according to the acoustic characteristics thereof.

8 Claims, 4 Drawing Sheets

DELIVERY SYSTEM, TRANSMISSION APPARATUS, AND DELIVERY METHOD

CROSS REFERENCES TO RELATED APPLICATIONS

The present invention contains subject matter related to Japanese Patent Application JP 2008-053864 filed in the Japanese Patent Office on Mar. 4, 2008, the entire contents of which being incorporated herein by reference.

BACKGROUND OF THE INVENTION

1. Field of the Invention

The present invention relates to a delivery system, a transmission apparatus, and a delivery method, in particular, to a delivery system, a transmission apparatus, and a delivery method that deliver an audio signal that has been corrected according to an audio reproduction environment of a reception terminal.

2. Description of the Related Art

So far, a sound such as music has been digitally encoded and the resultant compressed audio signal has been provided to the user through the Internet. For example, the user can download an audio signal of his or her favorite music through the Internet, record the downloaded audio signal to a personal computer, reproduce the audio signal from the personal computer, and listen to his or her favorite music. When the user has transferred the audio signal to a portable reproduction terminal connected to the personal computer, he or she can listen to his or her favorite music even when he or she is out.

In this case, from a view point of copyright protection, as described in Japanese Patent Laid-Open Publication No. 2001-16109, hereinafter referred to as Patent Document 1, a technique that allows only a preregistered user to download his or her favorite audio signal has been proposed.

In addition, streaming delivery that transfers video data including moving image data, an audio signal, and auxiliary data through a network and reproduce them in real time has been performed. Since the streaming delivery allows the user to watch and listen to data without necessity of recording transmission data to a hard disk, it has advantages of reduction of listening waiting time, protection of illegal copy, and watching and listening of moving image data, audio signal, and so forth in real time.

In the stream delivery, for example, a moving image, an audio signal, and so forth as delivery materials are converted into streaming data and converted moving image data, audio signal, and so forth are uploaded to a delivery server. As streaming data of audio signal, a format including Windows Media Audio (extension: wma) that can be reproduced by Windows Media Player (registered trademark) and Real Audio (extension: ra) that can be reproduced by Real Player (registered trademark) is selected. Data updated to the delivery server are linked from web sites. Thus, when the user accesses a web site, clicks a link button for streaming content, and selects it, the delivery server starts delivery of streaming.

In recent years, so-called Internet radio delivery using streaming delivery has been performed. Internet radio is delivered to personal computers and wireless local area network (LAN), motor vehicle onboard terminals, and so forth through the Internet.

Audio reproduction environments of the reception terminal side that receives audio signal and so forth may be an environment using for example a headphone, an interior of a motor vehicle, a simple device associated with a personal computer, a so-called Hi-Fi audio device, and so forth. These terminals largely differ in acoustic effects.

However, so far, in radio broadcasts and cable television broadcasts using radio waves, a broadcast station has delivered the same data regardless of audio reproduction environments of reception terminals. In delivery using the Internet, although compression rates may have been selected according to capacities of communication lines, data having the same characteristics have been delivered regardless of audio reproduction environments of reception terminals.

Thus, as disclosed in Japanese Patent Laid-Open Publication No. 2003-111200, referred to as Patent Document 2, an acoustic processing device that corrects an audio signal according to the audio reproduction environment before a sound is output from a speaker (speakers) has been proposed.

The acoustic processing device of Patent Document 2 is a reclining chair type acoustic processing device having speakers disposed in the headrest portion and performs a sound image localization process that corrects an audio signal such that the user can hear sound generated behind his or her ears from a predetermined position, for example, in front of him or her.

SUMMARY OF THE INVENTION

In the foregoing delivery system, reception terminals can have a mechanism that corrects characteristics of individual audio reproduction environments. However, if each reception terminal has a high performance correction mechanism that can correct an audio signal according to a complicated audio reproduction environment such as an interior of a motor vehicle, the cost of the reception terminal will increase.

In view of the foregoing, it would be desirable to provide a delivery system, a transmission apparatus, and a delivery method that are a simple apparatus and method that deliver delivery data according to an audio reproduction environment of a reception terminal.

According to an embodiment of the present invention, there is provided a delivery system having a transmission apparatus and a plurality of reception terminals communicably connected through a network. The transmission apparatus includes a correction section which pre-obtains a plurality of types of correction coefficients according to acoustic characteristics of the plurality of reception terminals and forms a plurality of corrected audio signals based on an audio signal and the correction coefficients; a conversion section which converts the plurality of corrected audio signals into a plurality of pieces of delivery data; and a delivery server which delivers the delivery data to the reception terminals through the network. Each of the reception terminals includes a communication section which communicates with the transmission apparatus. The transmission apparatus delivers to the reception terminals the delivery data according to the acoustic characteristics thereof.

According to an embodiment of the present invention, in the delivery system, the corrected audio signals are obtained by performing a convolution process for the audio signal and the correction coefficients.

According to an embodiment of the present invention, in the delivery system, the reception terminals are disposed, for example, in motor vehicles. The transmission apparatus forms a plurality of pieces of delivery data according to a plurality of models and/or types of motor vehicles and delivers to the reception terminals the delivery data according to the models and/or types of the motor vehicles in which the reception terminals have been disposed.

According to an embodiment of the present invention, in the delivery system, the transmission apparatus forms a plurality of pieces of delivery data according to the plurality of types of motor vehicles. It is preferred that if the transmission apparatus stores the delivery data according to the models of the motor vehicles in which the reception terminal has been disposed, the transmission apparatus deliver to the reception terminals the delivery data according to the models of the motor vehicles. It is preferred that if the transmission apparatus does not store the delivery data according to the models of the motor vehicles in which the reception terminals have been disposed, the transmission apparatus deliver to the reception terminals the delivery data according to the types of the motor vehicles.

According to an embodiment of the present invention, in the delivery system, it is preferred that the delivery server have an open point at which the delivery server publishes a plurality of pieces of the delivery data. It is preferred that when the reception terminals access an open point according to the acoustic characteristics of the reception terminals, the delivery server deliver to the reception terminals delivery data according to the acoustic characteristics of the reception terminals. In addition, it is preferred that the reception terminals access the open point through a web server.

According to an embodiment of the present invention, there is provided a transmission apparatus bidirectionally communicable with a plurality of reception terminals through a network. The transmission apparatus includes a correction section, a conversion section, and a delivery server. The correction section pre-obtains a plurality of correction coefficients according to acoustic characteristics of the plurality of reception terminals and forms a plurality of corrected audio signals according to an audio signal and the correction coefficients. The conversion section converts the plurality of corrected audio signals into a plurality of pieces of delivery data. The delivery server delivers the delivery data to the reception terminal through a network. The transmission apparatus delivers to the reception terminals the delivery data according to the acoustic characteristics thereof.

According to an embodiment of the present invention, there is provided a delivery method. A plurality of correction coefficients with which an audio signal is corrected are calculated according to a plurality of spaces having different acoustic characteristics. Corrected audio signals are formed according to the audio signal and the correction coefficients. The corrected audio signals are converted into delivery data and the delivery data are supplied to a delivery server. The delivery server is caused to deliver delivery data according to acoustic characteristics of the reception terminals when they issue a data delivery request.

In the embodiments of the present invention, a plurality of correction coefficients are obtained according to acoustic characteristics of a plurality of reception terminals. With an audio signal and the plurality of correction coefficients, a plurality of corrected audio signals are formed. The plurality of corrected audio signals are converted into a plurality of pieces of delivery data. A transmission apparatus delivers delivery data to reception terminals through a network according to acoustic characteristics of the reception terminals. Thus, suitable delivery data can be formed without necessity of disposing on the reception terminal side a mechanism that corrects an audio signal according to acoustic characteristics thereof.

According to the embodiments of the present inventions, since suitable delivery data can be formed without necessity of disposing on the reception terminal side a mechanism that corrects an audio signal according to acoustic characteristics thereof, the user can obtain delivery data according to an audio reproduction environment of a space in which a reception terminal is disposed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing a structure exemplifying a convolution processing device 22a.

DETAILED DESCRIPTION OF THE PREFERRED EMBODIMENTS

Next, with reference to the accompanying drawings, embodiments of the present invention will be described.

Figure 1:
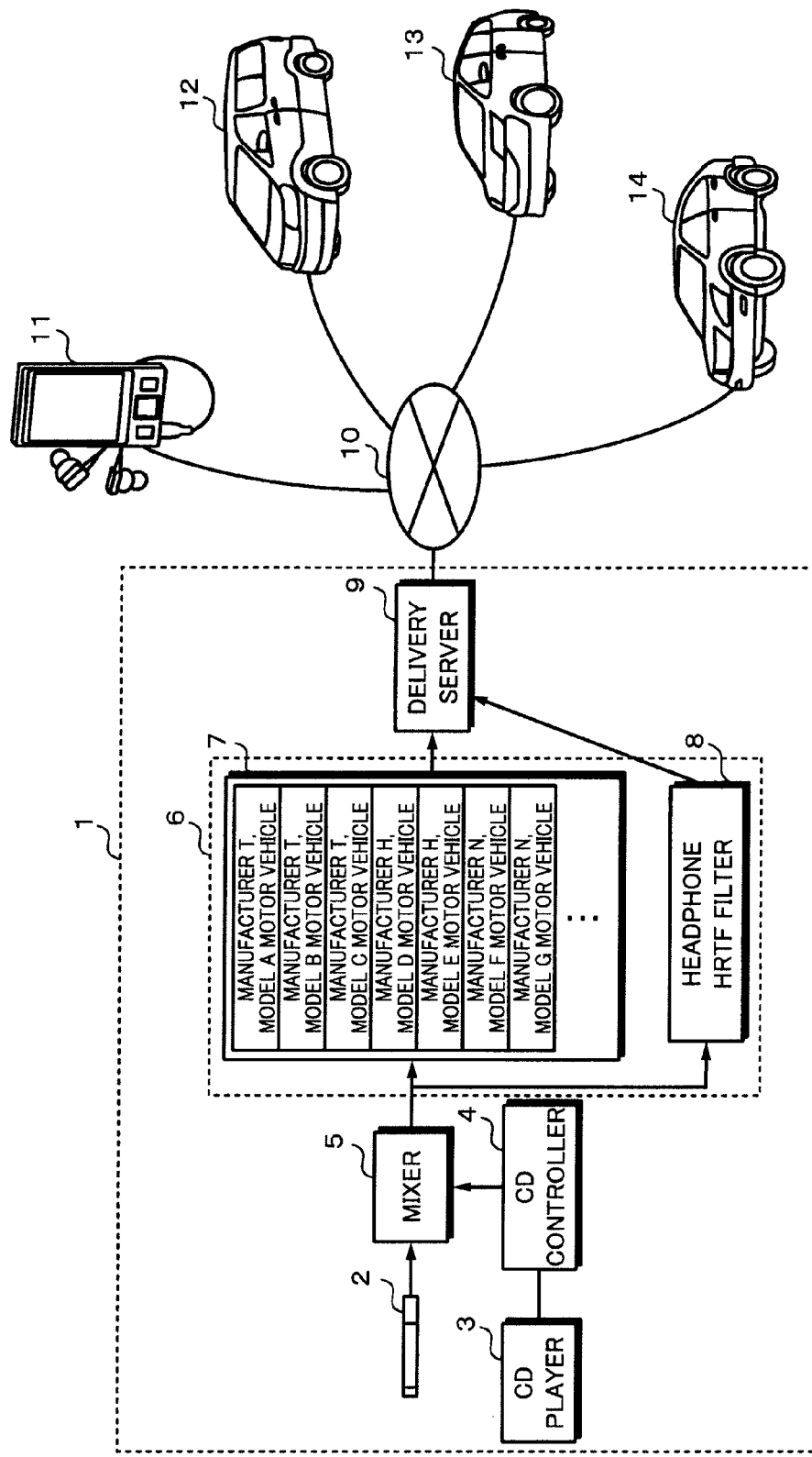
FIG. 1 is a schematic diagram showing a structure exemplifying a delivery system according to an embodiment of the present invention.

FIG. 1 shows an example of a delivery system according to an embodiment of the present invention. This delivery system delivers an audio signal through the Internet.

In FIG. 1, reference numeral 1 is a service provider as a transmission apparatus; reference numeral 2 is a microphone; reference numeral 6 is a convolution processing filter, reference numeral 7 is a motor vehicle model categorized filter group; reference numeral 11 is a headphone stereo as a portable reproduction terminal; reference numeral 12 is a manufacturer T, model A, motor vehicle in which a reception terminal is disposed (hereinafter referred to as motor vehicle A); reference numeral 13 is a manufacturer H, model D, motor vehicle in which a reception terminal is disposed (hereinafter referred to as motor vehicle D); reference numeral 14 is a manufacturer T, model B, motor vehicle in which a reception terminal is disposed (hereinafter referred to as motor vehicle B). The reception terminals receive a delivered audio signal and reproduce it.

On the service provider 1 side, an audio signal collected by the microphone 2 and an output signal that is output through a CD controller 4 are input to a mixer 5. The mixer 5 performs a sound adjustment process and so forth for the input signals and outputs the resultant audio signal. The audio signal that is output from the mixer 5 is input to the convolution processing filter 6. The convolution processing filter 6 is composed of a motor vehicle model categorized filter group 7 that corrects data transmitted to motor vehicle onboard reception terminals and a headphone head related transfer function (HRTF) filter 8 that corrects data transmitted to reception terminals that use a headphone such as a headphone stereo. HRTF is a transfer function of the head of a human.

In FIG. 1, the filters for motor vehicle onboard reception terminals are different from the filter for reception terminals using a headphone. However, these filters may not be separately structured. In addition, the motor vehicle model categorized filter group 7 may not be composed of filters that correct audio signals according to acoustic characteristics of designated motor vehicle models such as a manufacturer T, model A, motor vehicle. Instead, filters may be provided according to motor vehicle types such as one box, sedan, minivan, and so forth. If filters are provided according to motor vehicle types, it is preferred that commercial motor vehicles be categorized as these types. In addition, since it is difficult to set correction coefficients based on which audio signals are corrected according to acoustic characteristics of all models and all manufacturing years of commercial motor vehicles to the motor vehicle model categorized filter group 7, motor vehicle model categorized filters and motor vehicle type categorized filters may be used in combination.

An audio signal that is input to the convolution processing filter 6 is input to filters that correct the audio signal according to the acoustic characteristics of the interior space of each motor vehicle and the acoustic characteristics of the headphone and the audio signal is corrected according to the audio reproduction environment of each reception terminal. Thereafter, a stream generation section (not shown) converts the corrected audio signals into streaming data to be delivered through the Internet.

The convolution processing filter 6 has correction coefficients that are different convolution coefficients as data. Based on the correction coefficients, an audio signal is corrected according to acoustic characteristics of the environment in which the reception terminal is disposed. In the delivery system of this embodiment of the present invention, the motor vehicle model categorized filter group 7 that has correction coefficients based on which acoustic characteristics become optimum when the user listens to an audio in a motor vehicle, namely those based on which an audio signal that has nearly the same characteristics as those of the original audio signal is generated, is provided.

In the delivery system shown in FIG. 1, filters for those including manufacturer T model A motor vehicle, manufacturer H model D motor vehicle, and manufacturer T model B motor vehicle are provided. When the user listens to an audio with a headphone, a phenomenon called lateralization of which a sound image is laterally localized in the brain occurs. To prevent this phenomenon, the delivery system of this embodiment of the present invention also provides the headphone HRTF filter 8 that has coefficients obtained from head related transfer function.

Streaming data are added with meta data of a corrected audio signals. The meta data contain information that represents motor vehicle models for which the streaming data are applicable.

The converted streaming data are input to a delivery server 9. When delivery requests are made from the reception terminals of the headphone stereo 11, the motor vehicle A 12, the motor vehicle D 13, the motor vehicle B 14, and so forth, optimum streaming data are delivered from the delivery server 9 to the headphone stereo 11, the motor vehicle A 12, the motor vehicle D 13, the motor vehicle B 14, and so forth, respectively, through Internet 10.

Each reception terminal that receives delivered streaming data has a communication section (not shown) that can bidirectionally communicate with the delivery server 9. The reception terminal determines whether or not there are delivery data applicable for the local audio reproduction environment by accessing the delivery server 9 through the network. For example, the reception terminal disposed in the one box type manufacturer T motor vehicle A 12 accesses the delivery server 9, determines whether or not there are streaming data applicable for the manufacturer T motor vehicle A 12, and when there are applicable data, receives streaming data applicable for the manufacturer T motor vehicle A 12. The delivery server 9 side may determine whether or not there are applicable streaming data. If there are no applicable data and motor vehicle type categorized filters are provided, the reception terminal accesses the delivery server 9 and receives streaming data applicable for the one-box type motor vehicle.

The reception terminal is initially set up for information that represents its attributes, for example, the motor vehicle model in which the reception terminal is disposed (for example, manufacturer T model A motor vehicle) and motor vehicle type, or whether it is a headphone stereo. If the reception terminal is set up for the motor vehicle and the convolution processing filter 6 has motor vehicle type categorized filters, the reception terminal is also set up for the motor vehicle type (one box or the like). When one of motor vehicle types for the convolution processing filter 6 is selected, even if the reception terminal is used for a motor vehicle for which the vehicle model categorized filter set 7 has not been set up, appropriate streaming data can be received.

Instead, the reception terminal may access the delivery server 9 through a web server on the Internet. For example, when the reception terminal accesses a home page and the user selects a motor vehicle model and a motor vehicle type with a mouse, the reception terminal can receive streaming data according to the selected motor vehicle model and motor vehicle type from the linked delivery server 9.

In the foregoing embodiment, a structure that delivers an audio signal that is input from the microphone 2 or a compact disc (CD) player 3 is described. In addition, a system to which another AV device is connected may be structured. When an AD converter is disposed between the convolution processing filter 6 and the AV device, an analog audio signal may be input.

Figure 2:
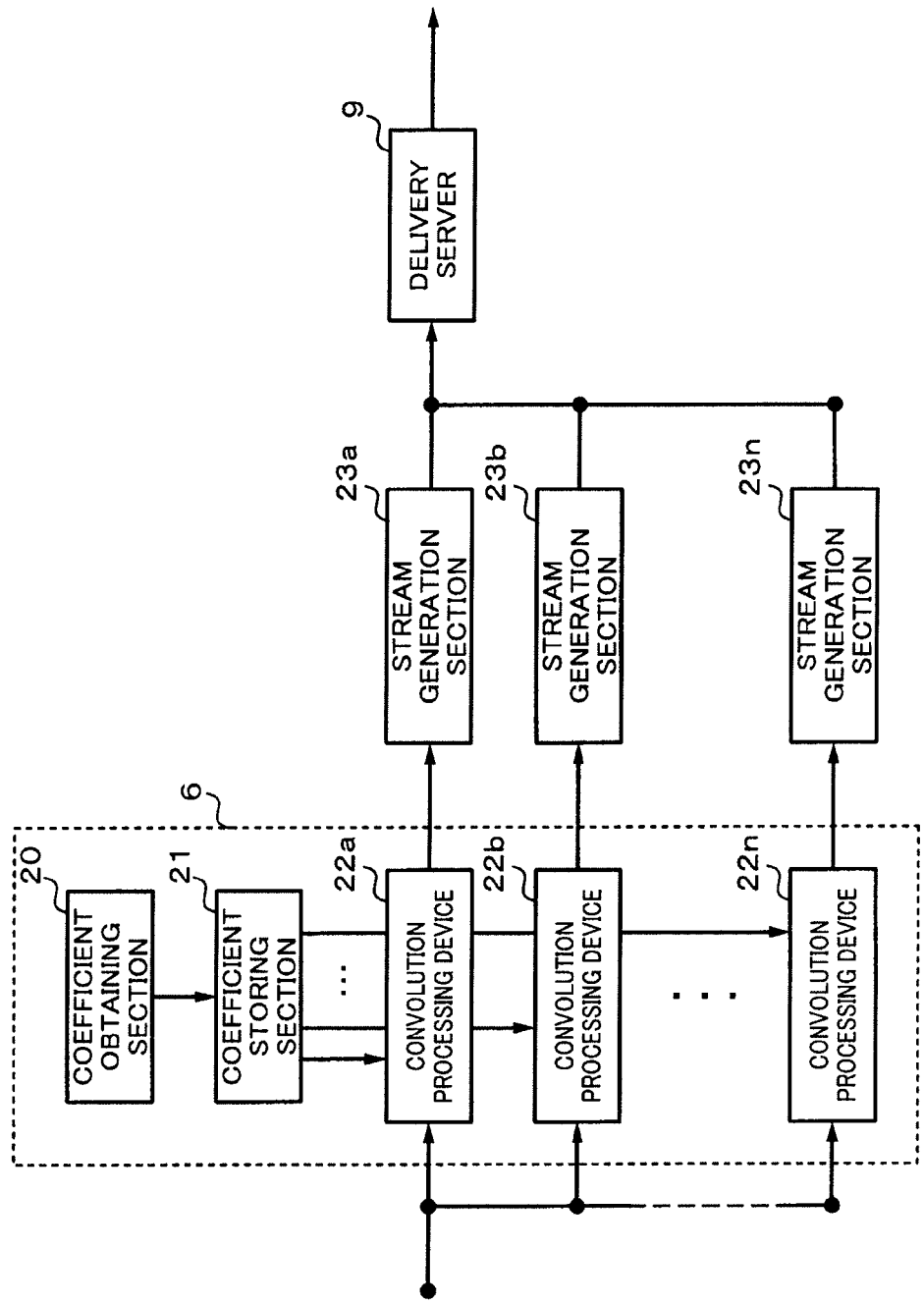
FIG. 2 is a block diagram showing a structure exemplifying a streaming system according to an embodiment of the present invention.

FIG. 2 shows an example of a streaming system according to an embodiment of the present invention. The streaming system is composed of N convolution processing devices 22a to 22n, a coefficient obtaining section 20 that obtains a correction coefficient used for the convolution process, a coefficient storing section 21 that stores correction coefficients that are output to the convolution processing devices 22a to 22n, stream generation sections 23a to 23n that convert corrected signals that are input from the convolution processing devices 22a to 22n into streaming data, and the delivery server 9 that delivers the streaming data that are input from the stream generation sections 23a to 23n to the Internet.

The convolution processing devices 22a to 22n are devices that convolute the input audio signal with a predetermined correction coefficient and outputs the resultant signal as a corrected audio signal. The same audio signal is input to the N convolution processing devices 22a to 22n. In addition, the N convolution processing devices 22a to 22n can generate N types of streaming data delivered for reception terminals having different acoustic characteristics.

Figure 3:
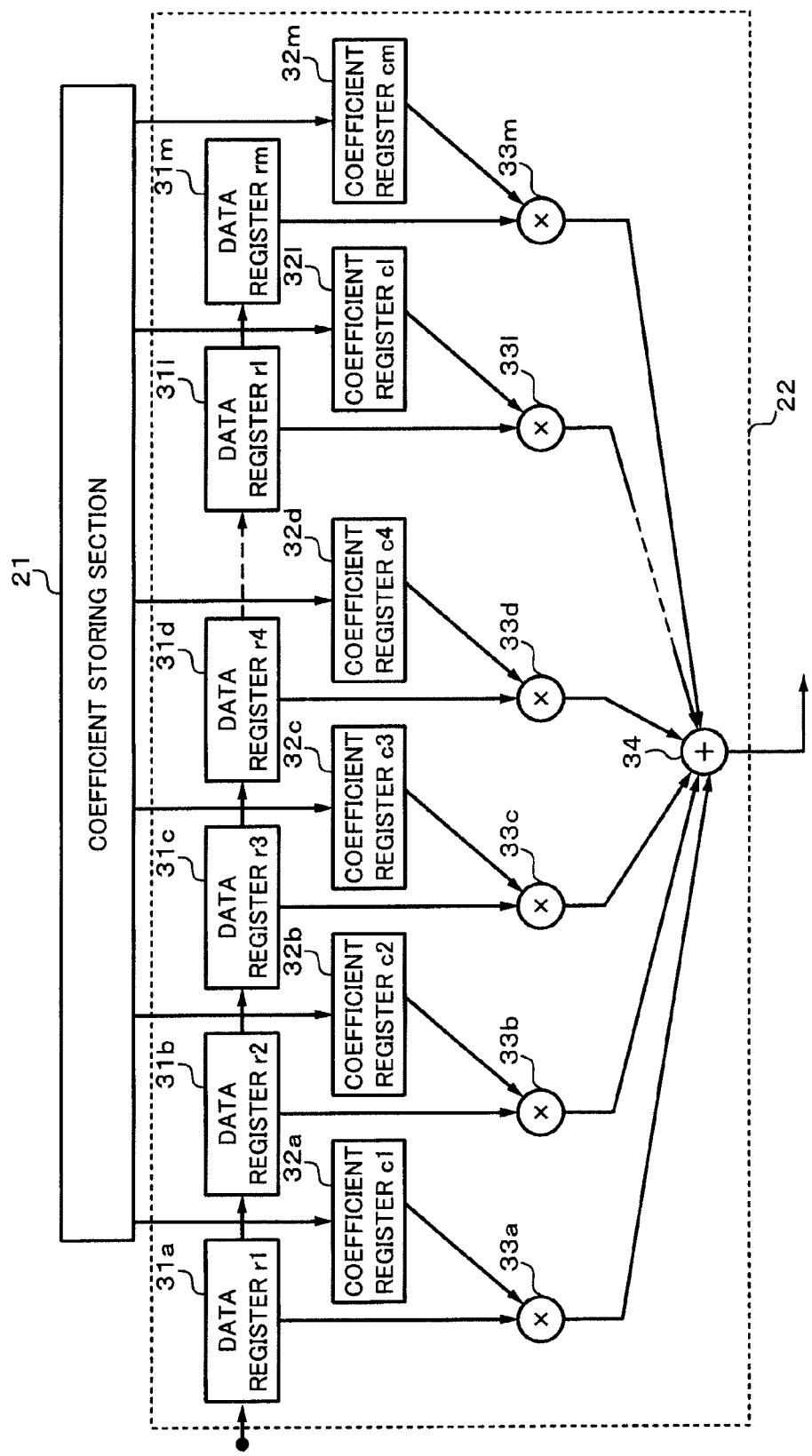

FIG. 3 shows a structure exemplifying the convolution processing devices 22a. The structure of convolution processing devices 22a is the same as that of each of the convolution processing devices 22b to 22n. The convolution processing devices 22a has M data registers 31a to 31m, M coefficient registers 32a to 32m, M multiplying devices 33a to 33m, and an adding device 34.

The coefficient registers 32a to 32m store correction coefficients that are input from the coefficient storing section 21. First, an audio signal is input to the data register 31a. Thereafter, data stored in the data registers 31a to 31m and data stored in the coefficient registers 32a to 32m are multiplied by the multiplying devices 33a to 33m, respectively. The multiplied results are added by the adding device 34 and the added result is output.

Data stored in the data registers 31a to 31e are input to the adjacent data registers 31b to 31m, respectively. New data are input to the data register 31a. By repeating these operations, convolution process is performed for the input audio signal with the given correction coefficients.

The audio signals for which the convolution process has been performed and that have been output from the convolution processing devices 22a to 22n are input to the stream generation sections 23a to 23n, respectively. The stream generation sections 23a to 23n convert the audio signals for which the convolution process has been performed and that have been input into those in a compression format that can be transmitted through the Internet. The converted corrected audio signals, namely streaming data that are data to be delivered, are input to the delivery server 9, for example, through a local area network (LAN). As streaming data, those, for example, according to Windows Media Audio or Real Audio are selected.

Convolution coefficients that are correction coefficients of a sound field can be obtained in the following manner.

Figure 4:
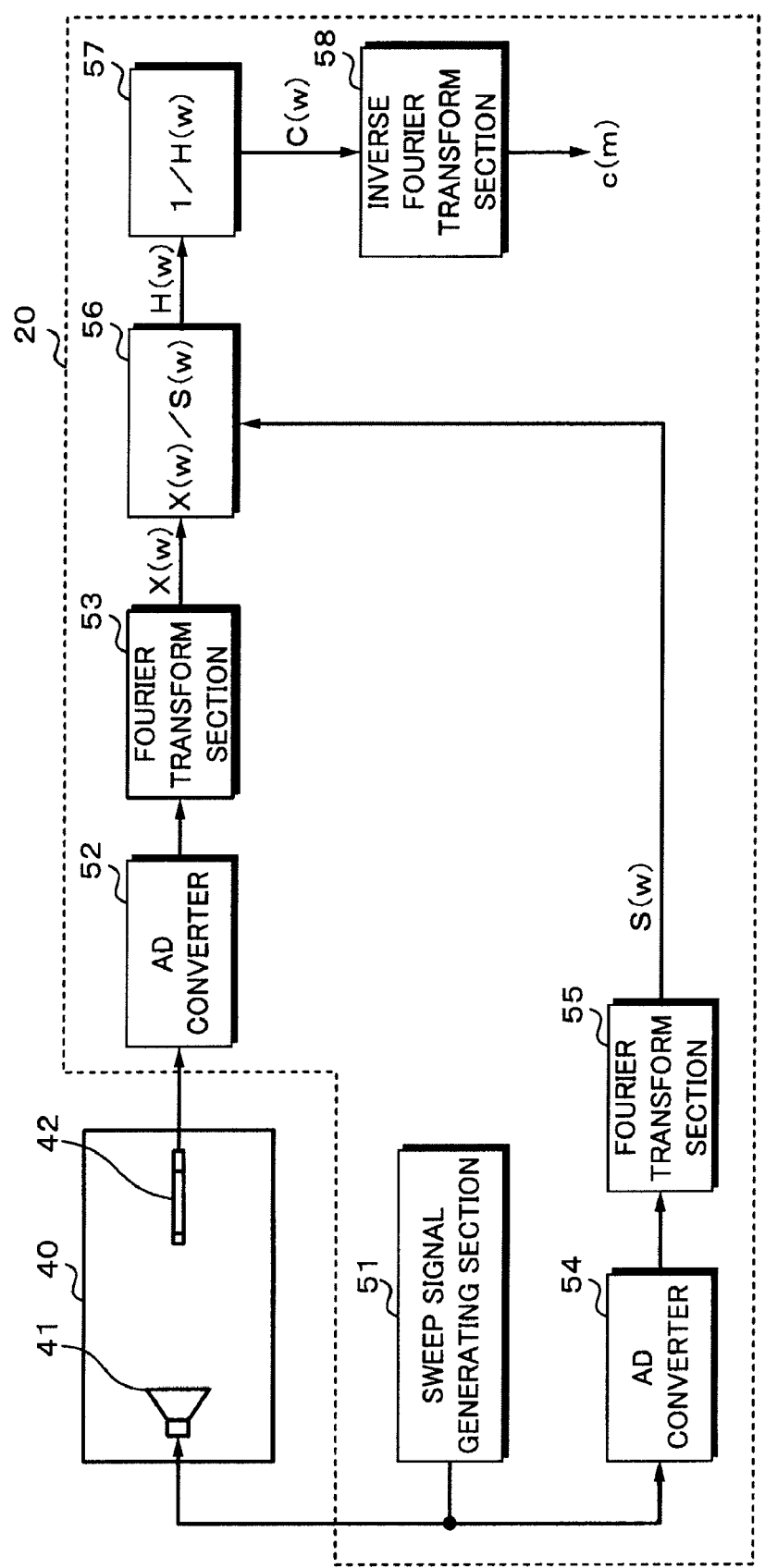
FIG. 4 is a block diagram exemplifying a method of obtaining a correction coefficient.

FIG. 4 is a functional block diagram showing a software process performed, for example, by a microprocessor. As shown in FIG. 4, a speaker 41 and a microphone 42 are disposed in a sound field 40 to be corrected, for example, the interior of a motor vehicle. Input to the speaker 41 is a sweep signal that sweeps a frequency band to be corrected, generated from a sweep signal generating section 51 of the coefficient obtaining section 20. The frequency band to be corrected is a frequency band in which humans can mainly hear sound with their ears, for example, from 100 Hz to 10 kHz.

Next, a sound is generated from the speaker 41 with the input sweep signal and the generated sound is collected by a microphone 42. The audio signal collected by the microphone 42 is an audio signal affected, for example, by sound reflections in the motor vehicle. The audio signal that is output from the microphone 42 is converted from an analog signal into a digital signal by an AD converter 52. Thereafter, the digital signal is Fourier transformed by a Fourier transform section 53. The result obtained by the Fourier transform is denoted by X(w).

On the other hand, the sweep signal (original signal) that is the same as the signal that is input to the speaker 41 is converted from an analog signal into a digital signal by an AD converter 54. Thereafter, the digital signal is Fourier transformed by a Fourier transform section 55. The result obtained by the Fourier transform is denoted by S(w).

Thereafter, a calculation section 56 calculates X(w)/S(w) and obtains transfer function H(w) of a sound field 40. Thereafter, a calculation section 57 calculates 1/H(w) and obtains transfer function C(w) that corrects a sound reproduced in the sound field 40. Last, an inverse Fourier transform section 58 inversely transforms transfer function C(w) and obtains correction coefficient c(m) based on which the audio signal is corrected.

The correction coefficient c(m) is stored in the coefficient storing section 21 and input to the convolution processing devices 22a to 22n.

The delivery server 9 delivers streaming data that are input from the stream generation sections 23a to 23n to the Internet through a predetermined open point. There are N open points corresponding to the stream generation sections 23a to 23n. For example, open point "T-syasyu A" is correlated with the stream generation section 23a that generates streaming data for manufacturer T model A motor vehicle. Open point "One Box" is correlated with the stream generation section 23n that generates streaming data for one box type motor vehicles.

If the delivery server 9 is named, for example, "HiFi Radio", when a reception terminal disposed in a manufacturer T, model A motor vehicle receives appropriate streaming data, the reception terminal accesses URL rtsp://HiFiRadio/T-syasyuA. rtsp is an example of protocol formats. The reception terminal is necessary to have client software that can perform communication according to this protocol format.

When the reception terminal disposed in manufacturer T, model A motor vehicle selects open point "rtsp://HiFiRadio/T-syasyuA", the reception terminal can receive streaming data for the manufacturer T, model A motor vehicle 12 generated by the stream generation section 23a.

On the other hand, when the reception terminal disposed in the manufacturer H, one-box type motor vehicle X for which the motor vehicle model categorized filter group 7 has not been set up, the reception terminal accesses, for example, URL rtsp://HiFiRadio/H-syasyuX. However, if the reception terminal disposed in the manufacturer H, one-box type motor vehicle X accesses URL "rtsp://HiFiRadio/H-syasyuX, since the motor vehicle model categorized filter group 7 has not been set up for manufacturer H, model X motor vehicle, there are no corresponding streaming data. In this case, if the reception terminal disposed in manufacturer H, model X motor vehicle accesses "rtsp://HiFiCarRadio/OneBox" instead, the reception terminal can receive streaming data for one box type motor vehicles, generated by the stream generation section 23n.

At this point, it may be determined whether or not the audio reproduction environment of the reception terminal that is accessing an open point is suitable for streaming data delivered therethrough. Although the listener has set the attributes (motor vehicle model, motor vehicle type, and so forth) of the reception terminal for "manufacturer T, model A motor vehicle, one box", if the reception terminal has mistakenly accessed URL "rtsp://HiFiRadio/H-syasyuD", the delivery server 9 accesses the reception terminal and checks for the attributes that have been set for the reception terminal so that the delivery server 9 does not deliver data to the reception terminal if the detected attributes do not match those that have been preset. In this case, when the reception terminal requests the delivery server for delivery again, the reception terminal can access an appropriate URL and receive optimum streaming data therefrom.

In the delivery system optimized for motor vehicles, the client side accesses an open point having a motor vehicle model name. If there is no such an open point, since the client side can access a widely categorized open point, for example, that having a motor vehicle type, a stream can be more optimally delivered.

If the user wants to receive streaming data with the headphone stereo 11, when the headphone stereo 11 side accesses, for example, URL "rtsp://HiFiRadio/Headphones" as open point "Headphones" according to the stream generation section 23b that generates streaming data for the headphone stereo 11, the headphone stereo 11 side can the receive streaming data.

In such a manner, when a plurality of types of streaming data that have been corrected are provided and optimum streaming data are delivered according to a request from a reception terminal, the reception terminal can satisfactorily receive delivery streaming data without necessity of providing a correction mechanism. In addition, since data having optimum acoustic characteristics can be delivered to individual motor vehicle models, the listener can comfortably listen to delivery streaming data.

Although an embodiment of the present invention was specifically described, the present invention is not limited thereto. Instead, various modifications may be made based on the scope of the present invention.

For example, in the foregoing embodiment, a plurality of types of streaming data have been input to the delivery server 9, streaming data may be delivered while they are being appropriately corrected in real time according to a request from the reception terminal.

In addition, the reception terminal may automatically select appropriate streaming data based on meta data contained in streaming data.

It should be understood by those skilled in the art that various modifications, combinations, sub-combinations and alternations may occur depending on design requirements and other factors insofar as they are within the scope of the appended claims or the equivalents thereof.

What is claimed is:

1. A delivery system having a transmission apparatus and a plurality of reception terminals communicably connected through a network,
   the transmission apparatus comprising:
   a correction section which pre-obtains a plurality of types of correction coefficients according to acoustic characteristics of the plurality of reception terminals and forms a plurality of corrected audio signals based on an audio signal and the correction coefficients;
   a conversion section which converts the plurality of corrected audio signals into a plurality of pieces of delivery data; and
   a delivery server which delivers the delivery data to the reception terminals through the network,
   each of the reception terminals comprising:
   a communication section which communicates with the transmission apparatus,
   wherein the transmission apparatus delivers to the reception terminals the delivery data according to the acoustic characteristics thereof.

2. The delivery system as set forth in claim 1,
   wherein the corrected audio signals are obtained by performing a convolution process for the audio signal and the correction coefficients.

3. The delivery system as set forth in claim 1,
   wherein the reception terminals are disposed in motor vehicles, and
   wherein the transmission apparatus forms a plurality of pieces of delivery data according to a plurality of models and/or types of motor vehicles and delivers to the reception terminals the delivery data according to the models and/or types of the motor vehicles in which the reception terminals have been disposed.

4. The delivery system as set forth in claim 3,
   wherein the transmission apparatus forms a plurality of pieces of delivery data according to the plurality of types of motor vehicles,
   wherein if the transmission apparatus stores the delivery data according to the models of the motor vehicles in which the reception terminal has been disposed, the transmission apparatus delivers to the reception terminals the delivery data according to the models of the motor vehicles, and
   wherein if the transmission apparatus does not store the delivery data according to the models of the motor vehicles in which the reception terminals have been disposed, the transmission apparatus delivers to the reception terminals the delivery data according to the types of the motor vehicles.

5. The delivery system as set forth in claim 1,
   wherein the delivery server has an open point at which the delivery server publishes a plurality of pieces of the delivery data, and
   wherein when the reception terminals access an open point according to the acoustic characteristics of the reception terminals, the delivery server delivers to the reception terminals delivery data according to the acoustic characteristics of the reception terminals.

6. The delivery system as set forth in claim 5,
   wherein the reception terminals access the open point through a web server.

7. A transmission apparatus bidirectionally communicable with a plurality of reception terminals through a network, comprising:
   a correction section which pre-obtains a plurality of correction coefficients according to acoustic characteristics of the plurality of reception terminals and forms a plurality of corrected audio signals according to an audio signal and the correction coefficients;
   a conversion section which converts the plurality of corrected audio signals into a plurality of pieces of delivery data; and
   a delivery server which delivers the delivery data to the reception terminal through a network,
   wherein the transmission apparatus delivers to the reception terminals the delivery data according to the acoustic characteristics thereof.

8. A delivery method, comprising the steps of:
   calculating a plurality of correction coefficients with which an audio signal is corrected according to a plurality of spaces having different acoustic characteristics;
   forming corrected audio signals according to the audio signal and the correction coefficients;
   converting the corrected audio signals into delivery data and supplying the delivery data to a delivery server; and
   causing the delivery server to deliver delivery data according to acoustic characteristics of the reception terminals when they issue a data delivery request.

* * * * *